United States Patent [19]

Kazemzadeh

[11] Patent Number: 5,620,737
[45] Date of Patent: Apr. 15, 1997

[54] PROCESS FOR PREPARING HYDROLYZED FOOD PRODUCT FOR ANIMAL CONSUMPTION

[75] Inventor: Massoud Kazemzadeh, Bloomington, Minn.

[73] Assignee: Ortech, Inc., Bloomington, Minn.

[21] Appl. No.: 648,485

[22] Filed: May 15, 1996

Related U.S. Application Data

[63] Continuation of Ser. No. 332,136, Oct. 31, 1994, abandoned.

[51] Int. Cl.$^6$ .............................. A23L 1/31; A23L 1/314
[52] U.S. Cl. ..................... 426/641; 426/516; 426/517; 426/805
[58] Field of Search .................. 426/641, 644, 426/646, 511, 513, 516, 517, 448, 805, 807

[56] References Cited

U.S. PATENT DOCUMENTS

| | | | |
|---|---|---|---|
| 3,000,742 | 9/1961 | Kuster | 426/641 X |
| 3,447,929 | 6/1969 | Hale | 426/448 |
| 3,580,725 | 5/1971 | Kuster | 426/641 |
| 4,001,452 | 1/1977 | Williams | 426/517 X |
| 4,020,187 | 4/1977 | McCulloch et al. | 426/448 X |
| 4,162,336 | 7/1979 | Brown et al. | 426/448 X |
| 4,310,558 | 1/1982 | Nahm | 426/448 X |
| 4,338,340 | 7/1982 | Morimoto et al. | 426/104 |
| 4,396,158 | 8/1983 | Olsen | 241/2 |
| 4,482,574 | 11/1984 | Lee | 426/7 |
| 4,572,839 | 2/1986 | Guitteny et al. | 426/646 |
| 4,910,038 | 3/1990 | Ducharme | 426/641 |
| 4,974,504 | 12/1990 | Walraven | 99/483 |
| 4,997,469 | 3/1991 | Moore | 71/11 |
| 5,113,755 | 5/1992 | Anderson et al. | 99/483 |
| 5,120,565 | 6/1992 | Lanter et al. | 426/623 |
| 5,151,503 | 9/1992 | Fasi et al. | 530/412 |
| 5,165,950 | 11/1992 | Boehmer et al. | 426/559 |

FOREIGN PATENT DOCUMENTS

| | | | |
|---|---|---|---|
| 2685999 | 7/1993 | France | 426/644 |
| 59-213367 | 12/1984 | Japan | 426/644 |
| 59-220167 | 12/1984 | Japan | 426/644 |
| 2079579 | 1/1982 | United Kingdom | 426/641 |

*Primary Examiner*—Arthur L. Corbin
*Attorney, Agent, or Firm*—Frederick W. Niebuhr, Esq.

[57] ABSTRACT

A food product for animal consumption is prepared from an animal by-product, preferably a complete avian carcass. A heated hydrolyzing agent is applied by spray or dip coating to the carcass exterior. After initiation of hydrolysis, the carcass is ground, enhanced by additives, then steam heated to a temperature of about 200 degrees F. The heated by-product is provided as a slurry or as dry particulates to a twin screw extruder. As it is transported across several zones of the extruder, the by-product is thoroughly dispersively mixed and subjected to high pressures and temperatures, vented to release moisture, neutralized with a neutralizing agent, and blended under high temperatures and pressures sufficient to completely sterilize what has become a highly uniform and homogeneous by-product mass. The by-product mass is extruded and cut into pellets, which then are dried to a moisture content at or below 10 percent.

21 Claims, 2 Drawing Sheets

PROCESS FOR PREPARING HYDROLYZED FOOD PRODUCT FOR ANIMAL CONSUMPTION

This is a continuation of parent application Ser. No. 08/332,136, filed Oct. 31, 1994, now abandoned.

BACKGROUND OF THE INVENTION

The present invention relates to handling the by-products of animal husbandry and processing, and more particularly to the treatment of such by-products to produce a cohesive and shelf-stable food component of an animal diet, e.g. pet food, livestock feed or a supplement.

The widespread preference for meat as a protein source, in industrialized and agricultural nations alike, has led to a highly developed system for providing meat, poultry and fish for human consumption. Substantial animal by-product or waste is generated at several stages of this system. At the animal husbandry or farming stage there is a need to dispose of animals that are deformed, diseased or suffer premature mortality. The animal by-product generated at the processing stage typically consists of animal parts considered unfit or undesirable for human consumption.

The disposal of these by-products raises two major concerns. First is the considerable waste involved, as usable protein in these by-products is lost. Secondly, the safe and environmentally sound disposal of these by-products becomes increasingly difficult as the world population increases, and suitable sites for waste disposal become scarce.

While the entire food processing industry must deal with these problems, there is a particular and increasing concern within the poultry industry. In the United States and other industrialized nations, the demand for poultry relative to red meat has increased considerably, given poultry's reputation as a low-cholesterol source of protein. In the U.S. over the last 25 years, per capita consumption of white meat has nearly doubled. There has been a corresponding increase in waste protein from animal mortality during the raising of chickens, turkeys and other fowl, spent hens, and the by-products of processing plants.

Therefore, it is an object of the present invention to provide a process for recycling the animal by-product of a growing or processing operation, whether or not the by-product includes the complete animal carcass.

With respect to poultry, another object of the invention is to provide a process for preparing a proteinaceous and shelf-stable animal feed or pet food, using the entire avian carcass as a protein source.

A further object is to provide a food product for consumption by animals, e.g. as a pet food or livestock feed, in the form of a sterile, homogeneous, cohesive and shelf-stable matrix, based on the by-products of animal husbandry and/or processing.

Yet another object is to provide a process for dispersively mixing an animal by-product in a continuous mode and under high pressure and temperature conditions, to form a sterilized, at least partially hydrolyzed, cohesive and shelf-stable matrix suitable as a food source for animals or as a supplement to an animal feed.

SUMMARY OF THE INVENTION

To achieve the above and other objects, there is provided a process for preparing a food product for animal consumption from an animal by-product, including the following steps:

a. applying a hydrolyzing agent to alter the pH of an animal by-product and initiating hydrolysis of the animal by-product;

b. after allowing the hydrolysis to proceed for at least one minute, mechanically working the animal by-product to increase its pressure to a maximum pressure in the range of 250–900 psi, and to dispersively mix the animal by-product and hydrolyzing agent to form a substantially homogeneous by-product mass;

c. during said mechanical working, heating the animal by-product to temperatures that include a maximum temperature in the range of 250–365 degrees F., thus to sterilize the by-product mass and at least partially hydrolyze the by-product mass; and d. applying a neutralizing agent to the sterilized and at least partially hydrolyzed by-product mass, and blending the neutralizing agent and the by-product mass to substantially neutralize the by-product mass to a pH of 7.

While the hydrolyzing agent can be either basic or acidic, an alkali (e.g. potassium hydroxide or sodium hydroxide) is the preferred hydrolyzing agent, in which case the neutralizing agent is acidic, e.g. hydrochloric acid. When the animal by-product is an avian carcass, it is particularly advantageous to dip coat or spray coat the carcass to completely coat the feathers, raising their pH to about 9–10. Then, the carcass is preferably ground before mechanical working, to form a slurry that includes solids having diameters of at most about one-half of an inch.

The slurry, after the requisite holding period, is subjected to a steam treatment prior to mechanical working. Alternately, the slurry can be dried first to about 20 percent moisture by weight, and then subjected to steam. In either event, several additives can be combined with the slurry at this stage, including cereal grains, legumes, and moisture-controlling inorganic compounds.

The mechanical working, heating and blending are advantageously performed with a twin screw extruder. The extruder includes multiple stages that form in succession a mixing region, a neutralizing region and a blending region. Along the mixing region, the animal by-product is formed into the by-product mass. The neutralizing agent is added downstream of the mixing region. The blending region is downstream of the neutralizing region.

Beyond a neutralizing region, the by-product mass is forced through a shaping die and cut into pellets, which preferably are dried to reduce their moisture content to about 5–10 percent, by weight.

The resulting product is a sterile, homogeneous, cohesive and shelf-stable matrix consisting essentially of: at least partially hydrolyzed proteins from about 20 to about 70 percent, by weight; fat from about 0.5 to about 30 percent, by weight; and ash from about 0.3 to about 10 percent, by weight.

A relatively large complete avian carcass, e.g. of a turkey, is particularly well suited for this process, due to the ratio of carcass size and weight to feathers, and because all protein sources of the carcass are used. This advantage is facilitated by the manner of applying the hydrolyzing agent. Initial hydrolyzation occurs along and throughout the feathers with the hydrolyzing agent at its highest concentration. Subsequent grinding tends to disperse the hydrolyzing agent throughout the slurry.

Most of the hydrolysis, however, occurs within the twin screw extruder, which functions as a reactor to promote hydrolysis under the high temperature and high pressure conditions. The dispersive mixing within the extruder involves crushing, squeezing and shearing actions which thoroughly mix the animal by-product into a substantially homogeneous mass, in which the hydrolyzing agent is substantially evenly distributed. Due to the temperature and pressure extremes, complete sterilization and the requisite hydrolysis occur relatively quickly. At temperatures above 225 degrees F., the hydrolysis takes seconds to initiate and minutes to complete. This enables and facilitates a continuous process for forming the food product.

The extruded product is shaped by a die and cut into pellets that are sterile, homogeneous, cohesive and shelf-stable. If desired, the pellets are dried either in a continuous or batch mode.

Because the product is sterile, pathogenic problems related to meat and poultry, in particular salmonella poisoning, are solved.

The partial or complete hydrolyzation of the product eliminates problems related to allergies, to provide a source of hypoallergenic nutrition in pet food and animal feed. Substantial denaturation of protein also is accomplished, to increase digestibility and maximize energy conversion.

Thus, in accordance with the present invention, entire avian or other animal carcasses can be utilized in forming a sterile, homogeneous and shelf-stable source of protein for livestock, pets and other animals, while considerably reducing the need for disposal sites and treatment facilities to handle the carcasses.

BRIEF DESCRIPTION OF THE DRAWINGS

For a further appreciation of the above and other features and advantages, reference is made to the following detailed description and to the drawings, in which.

DETAILED DESCRIPTION OF THE PREFERRED EMBODIMENTS

Figure 1:
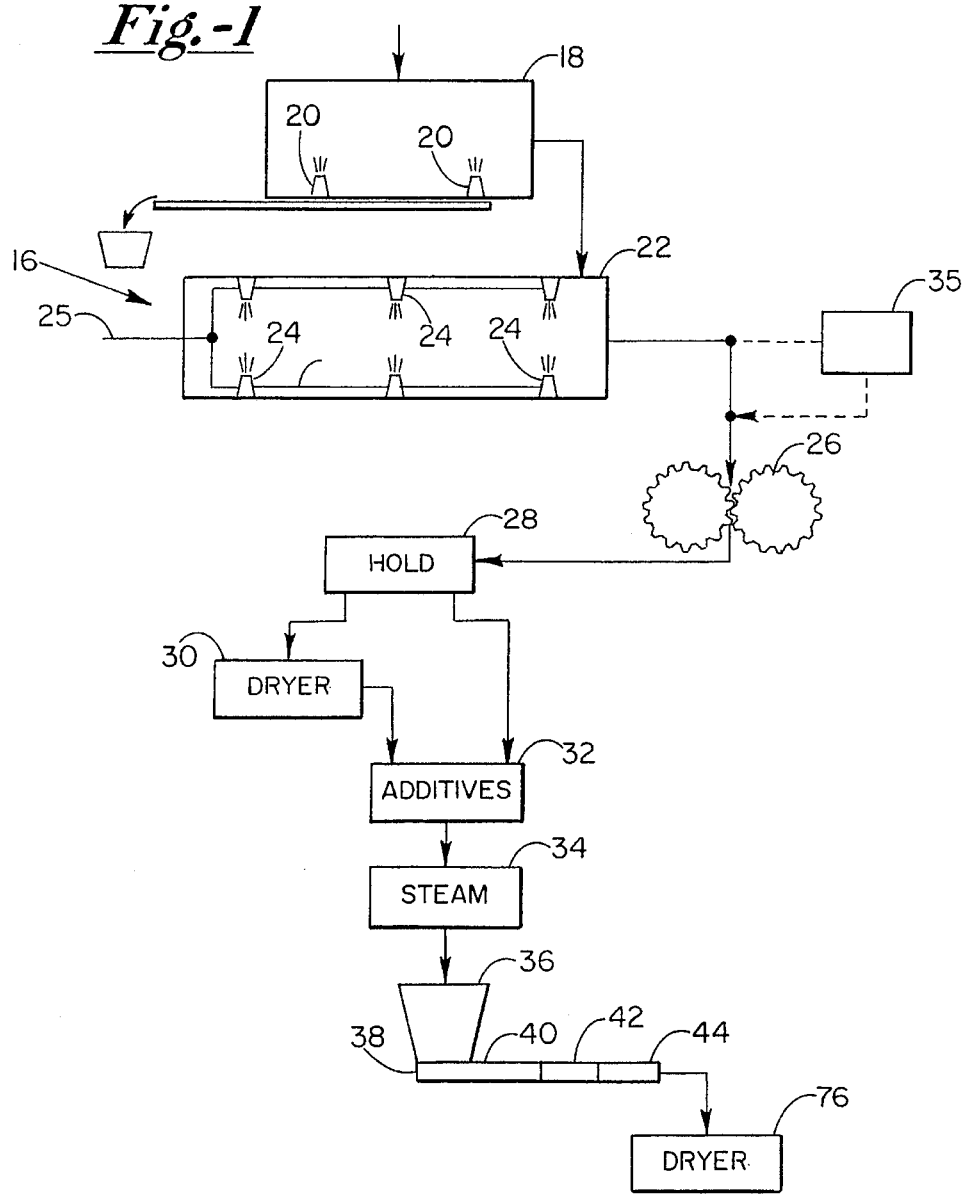
FIG. 1 is a diagrammatic view that illustrates a system for preparing a proteinaceous food product for animals, in accordance with the present invention.

Turning now to the drawings, there is shown in FIG. 1 a system 16 for preparing a food product for animal consumption, based on an animal by-product of animal farming or animal processing. More particularly, the system incorporates several optional features, the use of which depends on the type of processing and the type of animal by-product.

In the form first described, system 16 is particularly well suited for processing entire bird carcasses, e.g. from a growing operation or processing plant for turkeys. Offal also can be processed in system 16. The turkey carcasses result from malformed birds, birds that suffer premature mortality, and birds found to be diseased or otherwise not suitable for further processing toward human consumption. In the absence of processing according to the present invention, such carcasses present a disposal and environmental problem and a potential health risk as well.

System 16 includes a holding bin for carcasses delivered from growing and processing operations, a cleaning station 18 includes several nozzles 20 for directing pressurized heated air to at least 180 degrees F. and more preferably 200 degrees F. onto the carcasses to at least substantially remove calcium, silicon, silicon dioxide ($SiO_2$) and other ash. Ash and other foreign material are removed along a conveyor 21.

The air-cleaned carcasses are then provided to a chamber 22 for treatment with a hydrolyzing agent heated to 180 degrees F. Liquid spray nozzles 24 are shown in two rows, on opposite sides of the chamber. If desired, further nozzles can provide spray from above and below the carcasses in chamber 22.

The hydrolyzing agent is employed to alter the pH of the carcass and can be either acidic or alkali. An alkali hydrolyzing agent, e.g. sodium hydroxide (NaOH) or potassium hydroxide (KOH) is preferred, because it tends to be less corrosive to equipment employed in subsequent processing steps.

The hydrolyzing agent can be applied directly to the carcass in liquid form. One suitable solution is sodium hydroxide in water, with the sodium hydroxide at 5–50 percent of the solution, by weight. This solution, heated to 180 degrees F., is sprayed directly onto the carcasses from nozzles 24. As an alternative, the hydrolyzing agent is applied to the carcasses in powdered form, in which event nozzles 24 spray water with enzyme only. The first approach is likely to provide better penetration, while the latter approach improves the useful life of the nozzles and liquid supply lines 25.

In either event, the hydrolyzing agent is applied to the complete exterior of each carcass and is substantially confined to the carcass exterior. Thus, initial hydrolysis is concentrated along the carcass exterior, most significantly in the region of the feathers where the highest concentration of the hydrolyzing agent is most useful.

As further indicated below, when the entire carcass is considered, most of the hydrolysis occurs during a mechanical working of the carcass under high pressure and temperature conditions. At the same time, the "head start" involving early application of the agent in its highest concentration and only in the region about the feathers, facilitates overall hydrolysis. Another advantage of this exterior application is the reduction of unwanted bacteria.

Following application of the hydrolyzing agent, the carcasses are held in chamber 22 or elsewhere at a temperature of 175–200 degrees F. for a time sufficient to achieve a desired dissolution, more particularly in the range of one minute to one hour, during which time the external hydrolysis proceeds under warm or hot conditions.

After the predetermined holding time, the carcasses are provided to a grinding device 26, which reduces the carcasses to a slurry including a liquid and solids having dimensions (e.g. diameters) up to about one-half inch. From grinding device 26, the slurry is provided to a holding tank 28. At this stage the slurry, by weight, is typically 40–50 percent water. The slurry is provided to a drying device 30 for heating to a temperature above 212 degrees F., to reduce the moisture content to about 15–35 percent, by weight.

As indicated at 32, one or more of several additives may be added to the output of drying device 30. For example, cereal grains can be added to increase the starch and carbohydrate content, to reduce moisture, and to improve extrusion. Legumes can be added to increase the concentration of protein. Inorganic compounds, e.g. calcium bicarbonate, also can be added as a further means to control moisture if ash levels are not an issue. Enhanced with one or more additives, the by-product is then provided to a steam chamber 34, for steam heating to a temperature of about 200 degrees F.

In some applications the grinding device output is provided directly to steam chamber 34 with or without additives, bypassing drying device 30. Generally, dryer 30 can be bypassed when grains are added in quantities sufficient to reduce the moisture content of the mixture to below 40 percent.

For highly feathered animals, a further alternative is preferred, namely the use of a drying device 35 (alternate path in broken lines) following treatment with the caustic solution and before grinding. The high temperatures within dryer 35 promote hydrolysis at the feather sites exposed to the hydrolyzing agent. The efficiency of the hydrolyzing agent is enhanced because the feathers are subject to the highest concentration of caustics. The meat portion, which has a buffering effect on the pH, does not have a high concentration of the caustics until it is mixed thoroughly with the feathers and other outer surface portions in the extruder. Within the extruder, the buffering effect of the meat reduces the pH of the feather component, thus slowing hydrolysis.

The heated material is provided to a feeding device 36, from which the by-product is fed to a twin screw extruder 38 including several regions for processing the animal by-product: a mixing region 40 over which the by-product and hydrolyzing agent are dispersively mixed; a neutralizing region 42 along which a neutralizing agent is added; and a blending region 44 along which the neutralizing agent is thoroughly mixed with the by-product and hydrolyzing agent for pH balance.

Figure 2:
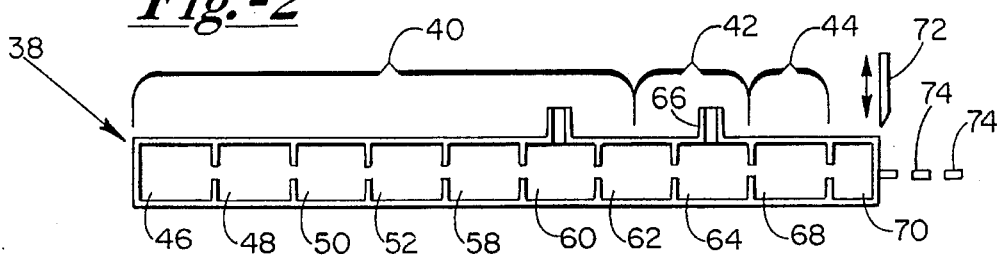
FIG. 2 is an enlarged view of a twin screw extruder used in the system of FIG. 1.

As seen in FIG. 2, these regions are comprised of multiple extruder zones in series. The various types of zones and their structures are known to those skilled in the art. Accordingly, such structure is not described in detail herein.

Mixing region 40 is comprised of several extruder zones. A conveying zone 46 receives material from feeding device 36. Along this zone, the by-product mixture is not tightly packed and typically incorporates about 25 percent air, i.e. available volume not occupied by the by-product mix. The temperature of the mix is within the range of about 65–180 degrees F., depending upon the heat loss from the 200 degrees F. temperature achieved after steam heating. Material is conveyed along zone 46 at about ambient pressure.

Figure 3:
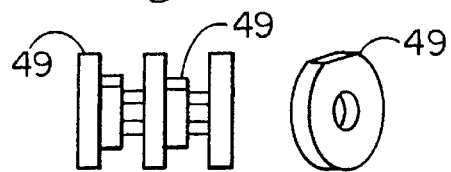
FIG. 3 illustrates the dispersive mixing blocks employed within the twin screw extruder.

From zone 46, the material enters a mixing zone 48, along which the material undergoes a slight increase in temperature, to within the range of 100–200 degrees F. Along zone 48 the pressure is not necessarily increased, but can increase up to about 300 psi. The by-product mixture becomes more uniform, as the larger solids remaining after grinding are either squeezed apart or crushed. FIG. 3 illustrates a series of disperive mixing blocks 49 contained within the extruder along mixing zone 48. The blocks are placed at different angles relative to one another, thus to accomplish the required mixing.

Immediately downstream of the mixing zone is a compression zone 50, along which the screw pitch is reduced. Accordingly there is a marked increase in pressure, to within the range of 150–800 psi, and the temperature is raised to within the range of 200–300 degrees F. As the material is compressed, it eventually occupies close to all of the available volume.

Figure 4:
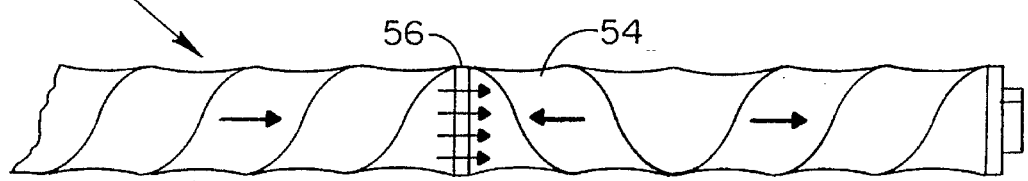
FIG. 4 is an enlarged view of a zone within the extruder.

The compression zone provides its material output to a shearing zone 52. As seen in FIG. 4, the screw pitch is reversed to form a reversed pitch section 54, followed by a downstream reversal to the original pitch direction. Along reversed pitched section 54, there is a tendency at least initially for material to flow upstream. The result is a considerable pressure increase along an annular segment 56 within the extruder, where upstream material eventually overcomes the tendency for reverse flow and forces the by-product mix through a narrow annular volume around segment 56 at extremely high pressures, i.e. in the range of 250–800 psi. The structure of the proteins is changed from crystalline to amorphous. There is a marked temperature increase as well, to temperatures in the range of 225–365 degrees F. The shearing action, at high temperatures and pressures, rapidly increases the hydrolysis initiated when the carcasses were coated with the alkali hydrolyzing agent. Peptide bonds linking amino acids are more readily broken. In effect, the protein is unfolded and more amenable to hydrogen and oxygen bonds.

A salient feature of the process is the combination of early external application of the hydrolyzing agent and the subsequent dispersive mixing of the hydrolyzing agent throughout the by-product accompanied by shearing at high temperatures and pressures. This combination enhances the uniformity of all parts of the carcass and degree of completion of hydrolysis. The more complex protein structures in the feathers are initially and exclusively subjected to the hydrolyzing agent at its highest concentration. Accordingly, by the time that subsequent grinding and mixing have exposed internal portions of the carcass to the hydrolyzing agent, breakdown and dissolution of exterior protein structures is well underway. The result is a substantially more uniform hydrolysis of the carcass, which enables and facilitates use of the entire carcass.

This process enables control of the amount of hydrolyzation, simply by varying the process parameters. Since the raw materials (proteins) are within the reactive chamber for a very short time (35–85 seconds), the production of racemic compounds does not occur, unless the by-product mix is sheared so heavily that it begins to burn. Racemic compounds are to be avoided if possible, since they lead to extensive degradation of the product taste and smell.

Conventionally, proteins have been hydrolyzed in a slurry or other environment featuring high water conditions, in order to allow mixing of the medium to introduce all segments of the medium to the hydrolyzing condition. Such a process is inefficient in its energy utilization, expensive and sloppy. By contrast, processing within the twin screw extruder enables hydrolization and denaturation of the proteins, as well as gelatinization of the starch, at substantially reduced moisture content. Because of the continuous and consistent mixing within the extruder of a highly viscous and low moisture product, the process is much more efficient and the results far more repeatable and reliable.

The by-product mix emerges from annular segment 56 as a homogeneous, uniform, completely sterilized and substantially hydrolyzed by-product mass.

The by-product mass travels from the shearing zone to a conveying zone 58, along which the pressure decreases to 150 psi or less and the temperature may decrease slightly. The by-product mass proceeds to a venting zone 60 that is open to the outside environment, whereby pressure is reduced to a substantially ambient pressure and the temperature also is reduced, to within the range of 150–200 degrees F. Significant moisture is lost along this zone, in the form of escaping steam and water vapor. From venting zone 60, the by-product mass is moved along a conveying zone 62 at a pressure in the range of 0–200 psi, and a temperature of about 150–200 degrees F. This conveying zone is the final zone of mixing region 40.

Neutralizing region 42 is composed of a single zone, i.e. a mixing and neutralizing zone 64. A neutralizing port 66 is employed to supply a neutralizing agent, e.g. an acid such as HCl, to this zone. The appropriate amount of neutralizing agent depends primarily on the amount of hydrolyzing agent initially applied to the carcass, along with the respective concentrations of the agents. Because of the grinding and dispersive mixing of the by-product after application of a hydrolyzing agent, the concentration of a neutralizing agent is preferably substantially lower than the initial concentration of a hydrolyzing agent. For example, a 10 percent HCl solution as the neutralizing agent is appropriately matched with an initial hydrolyzing agent of a 20 percent sodium hydroxide solution. At this stage, the reaction is exothermic resulting in high temperatures due to the reaction of the acid and the base, thus resulting in salt and water as by-products.

Blending region 44 is composed of that portion of zone 64 downstream of neutralizing port 66 and a compression zone 68 that follows zone 64. Because the by-product mass is homogeneous as it enters mixing and neutralizing zone 64, zones 64 and 66 are all that is required to accomplish a thorough blending. Material is conveyed along zone 64 at a pressure in the range of 150–300 psi, and at temperatures in the range of 150–300 degrees F.

Along compression zone 68 there is a reduction in screw pitch and a substantial increase in material pressure to within the range of 200–900 psi. Material temperature is increased as well, to within a range of 250–365 degrees F. Heating of the by-product mass within zones 64 and 68 is due, in part, to the exothermic reaction of the hydrolyzing agent and neutralizing agent which yields water and salt as reaction products and neutralizes the by-product mass to a pH of 7, or a predetermined pH based on end product use and requirements. At this point the by-product is completely sterilized and at least substantially hydrolyzed.

At the downstream end of compression zone 68 is a forming zone consisting of a die 70. The by-product exits extruder 38 through the die as a continuous mass, shaped by the die openings. Typically the by-product mass expands as it emerges from the die openings. However, if sufficient moisture is released from the by-product mass as it emerges, it may retain its size or actually shrink slightly. In either event, the moisture content of the emerging product typically is at least 20 percent, by weight, although the moisture content can vary over a range of 5–30 percent. As the product emerges, a knife 72 is periodically reciprocated vertically to cut the emerging by-product mass into pellets 74 of substantially uniform size. In a final stage, if necessary, pellets 74 are provided to a dryer 76 where their moisture content is reduced to about 5–10 percent.

The resulting pellets are shelf-stable, highly uniform, sterilized and substantially hydrolyzed. A high degree of consistency can be obtained, as exemplified in the following products, produced in separate runs occurring approximately one month apart from one another:

|  | Run 1 | Run 2 |
| --- | --- | --- |
| Percent Water | 8.71 | 9.51 |
| Percent Protein | 38.50 | 38.60 |
| Percent Fat | 1.40 | 5.53 |
| Percent Ash | 0.954 | 5.13 |

All percents are by weight. The pellets further are composed of sugars and carbohydrates. There is variance in the fat and ash content, due to differences in the analytical procedures and raw material sources.

More generally, the protein content can vary from about 20 percent to about 70 percent, by weight. The fat content can vary from about 0.5 percent to 30 percent, by weight, and the ash content can vary from about 0.9 percent to about 10 percent. The key element, protein, can vary considerably depending upon whether the animal by-product is a complete avian carcass as described above, or is the waste product of a hatchery or meat packing plant. The latter cases typically involve substantial increases in the fat percent and substantial reductions in the protein percent. Accordingly, there is a more critical need to enhance the product with legumes and other additives, and to add protein and cereal grains to improve handling by the twin screw extruder.

Figure 5:
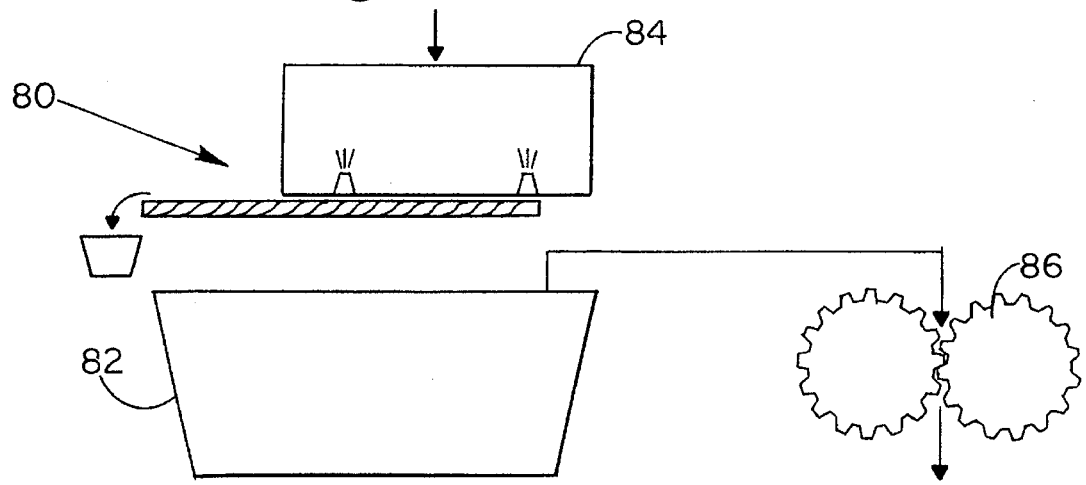
FIG. 5 illustrates part of an alternative embodiment food preparation system.

FIG. 5 illustrates part of an alternative system 80 for producing a livestock feed or pet food from an animal by-product. In lieu of spray chamber 22, system 80 includes a vat 82 containing a liquid solution of sodium hydroxide or other hydrolyzing agent. Avian carcasses air cleaned at a station 84 are dipped into vat 82 and remain in the vat a sufficient time for the liquid solution to thoroughly penetrate the feathers, thus effectively initiating hydrolysis over the entire bird exterior. After a sufficient time in vat 82, the carcasses are provided to grinder 86. Beyond the grinder, the animal by-product is processed in the same manner as described in connection with FIGS. 1–3.

Thus in accordance with the present invention, a complete avian carcass or other animal by-product is fully sterilized and at least partially hydrolyzed at elevated temperatures, enabling a recycling that completely eliminates the need for disposal. An initial external application of a hydrolyzing agent, preferably alkali, is particularly effective in treating avian carcasses, as the agent in its most concentrated form is applied to the relatively complex protein structures in the feathers. A subsequent grinding and dispersive mixing of the carcass more evenly disperses the hydrolyzing agent, with high temperatures and pressures further promoting hydrolysis and sterilization. The resulting product is homogeneous, completely sterilized, at least partially hydrolyzed, and provides an excellent source of protein either as a direct livestock feed or pet food, or as a supplement to these products. The product produced is a high quality, denatured protein and gelatinized starch for high efficiency feeds with mixtures of varied grains and hydrolyzed proteins. This type of feed is most useful in situations such as hog farming, where the amounts of waste produced are a problem. This type of feed leads to a substantial increase in weight gain conversion, and a corresponding substantial reduction in the amount of waste produced.

What is claimed is:

1. A process for preparing a food product for animal consumption from an animal by-product, including the steps of:

applying a hydrolyzing agent heated above ambient temperatures to exposed surfaces of an animal by-product to alter the pH of an animal by-product over said exposed surfaces to initiate hydrolysis of the animal by-product;

after allowing the hydrolysis to proceed for at least one minute, mechanically working the animal by-product under conditions sufficient to increase its pressure to at least 250 psi and to dispersively mix the animal by-product and the hydrolyzing agent during further hydrolysis of the animal by-product to form a substantially homogeneous by-product mass;

during said mechanical working, heating the animal by-product to temperatures, including a maximum temperature of at least 250 degrees F., sufficient to sterilize the by-product mass and to at least partially hydrolyze the by-product mass whereby most of said hydrolysis of the animal by-product occurs during said mechanical working; and then applying a neutralizing agent to the sterilized and at least partially hydrolyzed by-product mass, and blending the neutralizing agent and the by-product mass to substantially neutralize the by-product mass to a pH of 7.

2. The process of claim 1 wherein:

the hydrolyzing agent is an alkali, and the pH of the animal by-product over exposed surfaces thereof, as a result of said applying of the alkali, is at least 8.

3. The process of claim 2 wherein:

said pH is in the range of 9–10.

4. The process of claim 1 wherein:

the hydrolyzing agent is an acid, and the altered pH of the animal by-product at least over exposed surfaces thereof, due to the application of the acid, is at most about 4.

5. The process of claim 1 further including:

prior to said mechanical working, grinding the animal by-product to form a slurry including solids having diameters of at most about ½ inch.

6. The process of claim 5 wherein:

the step of allowing hydrolysis to proceed comprises holding the slurry at a temperature of 175–200 degrees F. for a period of from 1–60 minutes after the grinding step.

7. The process of claim 6 further including:

subjecting said slurry to steam heating, after said holding and prior to said mechanical working.

8. The process of claim 7 further including:

after said holding and before said steam heating, heating the slurry to a temperature above 212 degrees F. to dry the slurry sufficiently to reduce the slurry moisture content to about 20 percent by weight.

9. The process of claim 7 further including:

combining additives with the slurry prior to said steam heating.

10. The process of claim 9 wherein:

said additives include at least one of the following components: cereal grains, legumes, and moisture controlling inorganic compounds.

11. The process of claim 1 wherein:

said mechanical working and said blending are performed using a twin screw extruder.

12. The process of claim 11 wherein:

the extruder includes multiple stages that define in succession at least a mixing region, a neutralizing region and a blending region; and the animal by-product is formed into the by-product mass along the mixing region.

13. The process of claim 12 wherein:

the neutralizing region is downstream of the mixing region, and the neutralizing agent is added to the by-product mass along the neutralizing region; and the blending region is downstream of the neutralizing region.

14. The process of claim 11 further including:

forcing the by-product mass through a shaping die at a downstream end of the twin screw extruder, and cutting the shaped by-product mass immediately downstream of the die to form pellets of the by-product mass.

15. The process of claim 14 further including:

drying the by-product mass pellets.

16. The process of claim 1 further including:

directing forced air onto the animal by-product to remove ash from the animal by-product before the application of the hydrolyzing agent.

17. The process of claim 1 wherein:

the animal by-product is an avian carcass or offal.

18. The process of claim 1 wherein:

said mechanical working and heating substantially completely hydrolyze the by-product mass.

19. The process of claim 1 wherein:

said maximum pressure is in the range of 250–900 psi.

20. The process of claim 1 wherein:

said maximum temperature is in the range of 250°–365° F.

21. A process for preparing a food product for animal consumption from an animal carcass, including the steps of:

applying a hydrolyzing agent to an exterior surface of an animal carcass to alter the pH of the animal carcass and initiate hydrolysis of the animal carcass at least at and proximate the exterior surface;

after allowing the hydrolysis to proceed for at least one minute, mechanically working the animal carcass under conditions sufficient to increase its pressure to at least about 250 psi and to dispersively mix the animal carcass and the hydrolyzing agent during further hydrolysis of the animal carcass to form a substantially homogeneous by-product mass;

during said mechanical working, heating the animal carcass to temperatures, including a maximum temperature of at least about 250 degrees F., sufficient to sterilize the by-product mass and to at least partially hydrolyze the by-product mass whereby most of said hydrolysis of the animal carcass occurs during said mechanical working; and then applying a neutralizing agent to the sterilized and at least partially hydrolyzed by-product mass, and blending the neutralizing agent and the by-product mass to substantially neutralize the by-product mass.

* * * * *